Patented Sept. 27, 1932

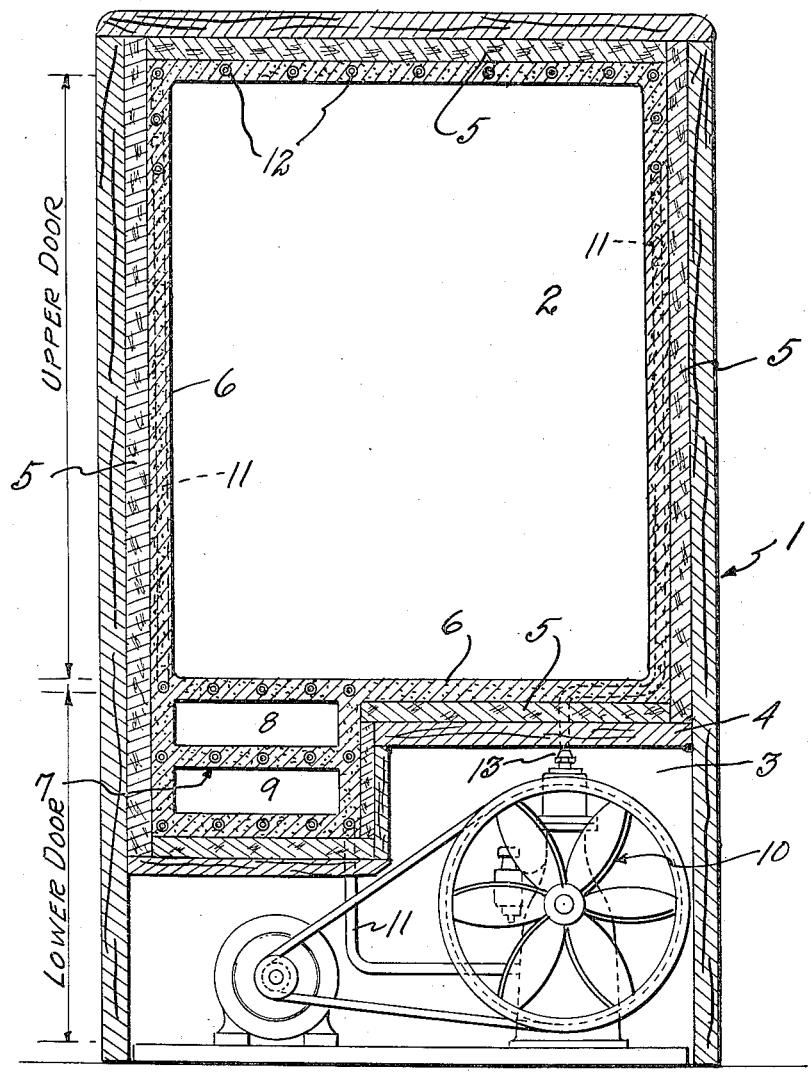

1,879,922

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

REFRIGERATING UNIT

Application filed December 10, 1927. Serial No. 239,053.

This invention relates to a refrigerating unit, and has to do particularly with what is known as a domestic refrigerating unit.

Heretofore in the designing and building of domestic refrigerating units, and particularly those of the one compartment type, that is, a single compartment containing the food chamber and cooling unit, and a compartment either above or below the food compartment for containing the refrigerating mechanism, it has been quite a problem to design and position a cooling unit that takes up a minimum of space, is convenient, and is theoretically efficient as to the transfer of heat. Various designs of cooling units and food compartments have been suggested or built but they have have all presented more or less the same problem of lack of space, particularly due to the space utilized by the cooling unit.

It is the object of the present invention to provide a domestic refrigerating unit, and particularly of the type having a single food compartment and a compartment therebelow for receiving the refrigerating apparatus, and to utilize the hitherto waste space in the lower compartment by positioning therein a suitable cooling unit or sharp freezing chamber. A further object of the present invention has to do with a novel cabinet design, and the formation of the walls of the food chamber and the sharp freezing chamber as an integral unit, but separately accessible, the food compartment and the sharp freezing chamber being preferably formed of artificial stone or similar material, and the refrigerant conducting coils or other cooling medium placed in heat conducting relation or embedded in a portion of the wall of the food chamber and in the wall or walls of the sharp freezing chamber.

In the drawing I have shown a domestic refrigerating unit embodying the features of my invention and showing the food compartment and sharp freezing chamber as being formed integrally but separately accessible.

The main features of the present invention relate to the novel and compact structure of the entire unit, cheapness and ease of manufacture, and the utilization of space to present a food compartment of the largest possible capacity permissible with a given size of cabinet. It will therefore be understood that my novel invention may be embodied in a great number of refrigerating units, principally domestic refrigerating units, of varying designs and capacity.

In the drawing I have illustrated a domestic refrigerating unit of the standard single food compartment type with the refrigerating apparatus compartment located beneath the food compartment. The cabinet itself may be generally designated 1 and preferably comprises a food compartment 2 and a lower compartment 3 for receiving and supporting the refrigerating mechanism. The compartments 2 and 3 may be divided by a suitable partition 4 which extends partially across the cabinet, as will be later described. A suitable lining of insulating material 5 may be positioned within the cabinet 1 and the interior walls of the food compartment 2 may be formed by plastically applying or pouring artificial stone within the mould formed by the wall 5 to form the interior walls 6 of the food compartment.

In forming the walls 6 of the food compartment it will be obvious that any suitable artificial stone material such as oxychloride cement or the like may be used, and this plastic material may be either troweled on the cork boards or other insulating material 5, or may be poured into place by inserting a suitable core within the mould formed by the cabinet 1 and the walls 5. As shown in the drawing the sharp freezing chamber, which may be generally designated 7, is preferably cast integrally with the walls 6 of the food compartment, and in this case it will be obvious that any suitable core may be utilized for defining the compartments 8 and 9 of the sharp freezing chamber. As shown in the drawing the sharp freezing chamber 7 preferably extends downwardly into the lower compartment 3 and past the main partition 4, whereby the entire upper part of the cabinet 1 may be utilized solely as a food compartment. In other words, the top wall of the sharp freezing chamber is co-extensive with one of the walls 6 of the food compartment.

In building up this type of refrigerating unit the refrigerating mechanism, which may be generally designated 10, is so positioned in the compartment 3 as to leave a considerable space at one side thereof, as is usually the case in standard commercial manufacture, and the refrigerating mechanism which comprises a suitable power unit, a compressor and condenser unit, is provided with suitable refrigerating coils which lead therefrom towards the cooling unit and/or sharp freezing chamber. In the drawing, which illustrates my preferred embodiment, the refrigerating coil 11 from the condenser preferably is positioned in the space defined by the sharp freezing chamber, and the coils thereof are preferably arranged, as shown, to define the separate compartments of the sharp freezing chamber whereby when the sharp freezing chamber is cast or formed the coils will be embedded in the walls of the sharp freezing chamber or chambers. The refrigerating coil 11 preferably extends upwardly from the sharp freezing chamber to the top part of the food compartment whereby the coil is preferably formed to pass back and forth transversely of the top wall of the food chamber, as shown at 12. The coil 11 then is brought downwardly adjacent another wall of the food chamber and terminates as at 13 at the compressor. As shown in the drawing the coil 11 is preferably embedded in the plastically applied walls of the food chamber but it will be understood that such coils may be suitably positioned in heat conducting relation with the wall or portion of the wall of the cooling unit.

The cooling unit 7, which is positioned exteriorly of the food compartment is provided with a suitable number of refrigerant conducting coils as to produce a sharp freezing effect in the compartment or compartments forming a part thereof. The refrigerating coil 11 is preferably so positioned and formed as at 12 in the top part of the food chamber as to present the proper cooling effect without effecting a sharp freezing, or at least, the cooling effect is preferably restricted or limited so as not to produce frost on the upper walls of the cooling unit. In other words the sharp freezing chamber is designed to be a sharp freezing chamber within the meaning as usually given thereto, and the other cooling unit defined by the coil 12 is designed to be a limited cooling unit as compared to the sharp freezing chamber.

It will be understood that the sharp freezing chamber 7 may be suitably insulated on all the lower sides thereof, and that such sharp freezing chamber may be of any size or design according to the particular arrangement of the compartment 3, and the refrigerating apparatus therein. It will also be understood that the sharp freezing chamber may be positioned exteriorly of the food compartment at any desired point or points in conformity with the peculiar design of the cabinet or formation of the parts thereof.

It will be understood by those skilled in the art that the refrigerating cabinet, as shown in the drawing, will preferably be provided with a single upper door for exposing the complete food compartment, and a single lower door suitably hinged or supported for covering the front of the compartment 3 containing the refrigerating mechanism and sharp freezing chamber. It will be obvious that in this case the opening of the upper door for the food compartment will not expose the sharp freezing chamber or compartments thereof, although the door may be so shaped as to expose only the sharp freezing chamber if it be so desired. It is my preferable construction, however, to expose the compartment of the sharp freezing chamber by a door or covering separate from the food compartment door, and this may be obviously done by having a single door for the food compartment and a single door covering for the compartment 3, or a suitable covering for the main part of the compartment 3, and a small door for the sharp freezing chamber, the idea being that the use of the sharp freezing chamber and the uncovering thereof will not affect the temperature of the food compartment, or vice versa, the use of the food compartment and the exposing thereof will not affect the sharp freezing chamber.

It will further be seen that by positioning the cooling coils adjacent the top of the food compartment to form a cooling unit, and positioning a second cooling coil or sharp freezing chamber at a separate point in the wall of the food chamber and remote from the first cooling unit, that I have made it possible to provide for a positive circulation of the air within the food compartment whereby to effect a very efficient cooling of the articles therein. This is especially true of the sharp freezing chamber located at one side and at the bottom of one food compartment, as shown in the drawing.

What I claim is:

1. A refrigerating unit comprising a cabinet, a storage compartment therein, a sharp freezing chamber formed integrally therewith and from plastically applied material having relatively good holdover and conductive properties, and refrigerant producing means positioned in heat conducting relation with a portion of the wall of said storage compartment spaced from said sharp freezing chamber.

2. A refrigerating unit comprising a cabinet, a lining of artificial stone therefor defining a storage compartment, a compartment in the lower part of the cabinet for receiving the refrigerating mechanism, and a sharp freezing chamber cast integrally with, and having a wall coextensive with a portion of one of the walls of the storage compartment and extending within the lower compartment.

3. A refrigerating unit comprising a cabinet, a lining of artificial stone therefor defining a storage compartment, a compartment in the lower part of the cabinet for receiving the refrigerating mechanism, a sharp freezing chamber cast integrally with the storage compartment and extending within the lower compartment, and refrigerant coils embedded in a wall or walls of said storage compartment and in a wall or walls of said sharp freezing chamber.

4. A refrigerating unit comprising a cabinet, a storage compartment formed therein to present a distinct accessible opening, a second storage compartment having a wall coextensive with a portion of a wall of the first compartment and presenting an accessible opening and compartment completely independent of the first storage compartment, refrigerating mechanism and refrigerant receiving and conducting means positioned in heat conducting relation with a part of said second named compartment, a portion of said refrigerant receiving and conducting means being also positioned in heat conducting relation with a portion of the wall of said first named compartment, the walls of both compartments being formed integrally of plastically applied material allowed to harden.

5. A refrigerating unit comprising a cabinet, an artificial stone lining therefor defining a storage compartment, a sharp freezing chamber formed integrally with said storage compartment but positioned exteriorly thereof, and refrigerant conducting means positioned in heat conducting relation with a portion of said first named compartment and a portion of said sharp freezing chamber.

6. A refrigerating unit comprising a cabinet, a food compartment and a refrigerating mechanism compartment positioned therein, and a sharp freezing chamber having a wall formed by one of the walls of the food compartment positioned in said second named compartment, said food compartment and sharp freezing chamber being formed integrally from plastically applied material allowed to harden.

7. A refrigerating unit comprising a cabinet, a food compartment having a storage space defined on the top and sides only by the walls of the cabinet, and a sharp freezing chamber formed integrally with, and having a wall coextensive with a portion of one of the walls of, the food compartment but projecting exteriorly thereof, said common wall being formed of relatively good heat conductive material.

8. A refrigerating unit comprising a cabinet, the upper walls of said cabinet providing the top and sides of a food compartment, a sharp freezing chamber having a wall coextensive with a portion of one of the walls of the food compartment and positioned below said food compartment to present an accessible opening independent of the food chamber opening, and refrigerant conducting means positioned in heat conducting relation with an upper part of the food chamber, the walls of said food compartment and sharp freezing chamber being molded integrally from plastically applied material having relatively good holdover and conductive properties.

9. A refrigerating unit comprising a cabinet, a food compartment therein, the walls of the food compartment being formed of a plastically applied material, refrigerating conducting pipes positioned in heat conducting relation with the upper part of the food compartment to form a cooling unit, and a sharp freezing chamber spaced from said cooling unit and projecting exteriorly of the food compartment, said food compartment and sharp freezing chamber being in heat conducting relation.

In testimony whereof I affix my signature.
LLOYD G. COPEMAN.